UNITED STATES PATENT OFFICE

JOHN H. WYLÉ, OF PHILADELPHIA, PENNSYLVANIA, ASSIGNOR OF ONE-HALF HIS RIGHT TO ABRAHAM EDWARDS, OF SAME PLACE.

IMPROVEMENT IN PUTTING UP ALKALIES FOR MAKING SOAP.

Specification forming part of Letters Patent No. 143,430, dated October 7, 1873; application filed June 18, 1872.

*To all whom it may concern:*

Be it known that I, JOHN H. WYLÉ, of Philadelphia, Pennsylvania, have invented a Composition to be used in the Manufacture of Soap, of which the following is a specification:

The object of my invention is a saponifying composition which can be handled with impunity, and can be contained in ordinary non-air-tight cases, and hence is better adapted for family use than caustic alkali.

I mix together dry hydrate of lime and carbonate of soda in the proportions of from one to three parts of the former to from three to six parts of the latter. This forms a dry non-absorbent powder, which can be deposited in any ordinary case without regard to the exclusion of the air, and which is ready for use at any time and in any desired quantity.

The method of using the composition is simply to boil it in water and then to pour the lye into hot rendered fat or tallow while the latter is being freely stirred. After saponification is complete the product may be boiled down in a lye of common salt, which has the effect of separating impurities and removing the surplus water from the soap.

In boiling the composition in water in the first instance the lime combines with the carbonic acid in the soda, forming caustic-soda lye and carbonate of lime, which may be precipitated, and the caustic lye and water poured off; but, as the quantity of carbonate is small, it will not, if permitted to remain in the lye, injure the soap, and may, after saponification, be removed by the above-mentioned process of boiling down in salt lye.

I am aware that a composition consisting of dry unslaked lime and alkali has been employed in the manufacture of soap; but such a composition is essentially different from that above described, as it must be secured in air-tight cases to prevent the lime from absorbing moisture and rendering the alkali caustic. When slaked lime is employed no such result will ensue, and ordinary non-air-tight cases can be used.

I claim—

As a new article of manufacture and commerce, a saponifying composition consisting of slaked lime and alkali, as set forth.

In testimony whereof I have signed my name to this specification in the presence of two subscribing witnesses.

JOHN H. WYLÉ.

Witnesses:
WM. A. STEEL,
HARRY SMITH.